US012669063B2

(12) United States Patent
Love et al.

(10) Patent No.: US 12,669,063 B2
(45) Date of Patent: Jun. 30, 2026

(54) FAN BLADE LEADING EDGE SHEATH

(71) Applicant: RTX Corporation, Farmington, CT (US)

(72) Inventors: Robert Andrew Love, Bloomfield, CT (US); Jiayuan Shen, East Lyme, CT (US)

(73) Assignee: RTX CORPORATION, Farmington, CT (US)

( * ) Notice: Subject to any disclaimer, the term of this patent is extended or adjusted under 35 U.S.C. 154(b) by 191 days.

(21) Appl. No.: 18/541,902

(22) Filed: Dec. 15, 2023

(65) Prior Publication Data

US 2025/0198294 A1 Jun. 19, 2025

(51) Int. Cl.
*F01D 5/28* (2006.01)
*F01D 5/14* (2006.01)

(52) U.S. Cl.
CPC ............ *F01D 5/288* (2013.01); *F01D 5/147* (2013.01); *F05D 2220/32* (2013.01); *F05D 2230/31* (2013.01); *F05D 2240/303* (2013.01); *F05D 2260/95* (2013.01)

(58) Field of Classification Search
CPC . F01D 5/288; F01D 5/147; F01D 5/28; F05D 2220/32; F05D 2230/31; F05D 2240/303; F05D 2260/95; F05D 2220/36
See application file for complete search history.

(56) References Cited

U.S. PATENT DOCUMENTS

| | | | | | |
|---|---|---|---|---|---|
| 5,908,285 | A * | 6/1999 | Graff | C25D 1/10 416/224 |
| 10,260,351 | B2 | 4/2019 | Parkin et al. | |
| 10,539,027 | B2 * | 1/2020 | Read | F01D 9/02 |
| 11,371,483 | B2 | 6/2022 | Burchardt et al. | |
| 12,215,600 | B2 * | 2/2025 | Foster | F01D 5/147 |
| 12,326,155 | B2 * | 6/2025 | Kray | F04D 29/388 |
| 2011/0033308 | A1 * | 2/2011 | Huth | F04D 29/023 416/241 R |
| 2011/0116906 | A1 * | 5/2011 | Smith | F04D 29/324 416/61 |
| 2016/0010468 | A1 * | 1/2016 | Kray | F01D 5/28 416/224 |
| 2016/0201482 | A1 | 7/2016 | Parkos, Jr. et al. | |
| 2024/0280024 | A1 * | 8/2024 | Kray | F01D 5/147 |

OTHER PUBLICATIONS

Search Report issued in European Patent Application No. 24219993.3; Date of Mailing Mar. 25, 2025 (13 pages).

* cited by examiner

*Primary Examiner* — Courtney D Heinle
*Assistant Examiner* — Andrew Thanh Bui
(74) *Attorney, Agent, or Firm* — CANTOR COLBURN LLP

(57) ABSTRACT

A sheath is provided. The sheath includes a leading edge portion having pressure and suction sides for respective association with pressure and suction sides of an airfoil and first and second wings respectively extending from the pressure and suction sides of the leading edge portion. The first wing includes a first elongate portion and a first trailing edge disposed at an end of and thinned relative to the first elongate portion. The second wing includes a second elongate portion and a second trailing edge disposed at an end of and thinned relative to the second elongate portion.

20 Claims, 4 Drawing Sheets

FAN BLADE LEADING EDGE SHEATH

BACKGROUND

Exemplary embodiments of the present disclosure relate generally to gas turbine engines and, in one embodiment, to a fan blade leading edge sheath for a gas turbine engine with a reduced wing thickness.

In a gas turbine engine, air is compressed in a compressor and compressor air is then mixed with fuel and combusted in a combustor to produce a high-temperature and high-pressure working fluid. This working fluid is directed into a turbine in which the working fluid is expanded to generate power. The generated power drives the rotation of a rotor within the turbine through aerodynamic interactions between the working fluid and turbine blades or airfoils. The rotor can be used to drive rotations of a propeller or fan or to produce electricity in a generator.

The air that is compressed in the compressor can be drawn into an inlet of the compressor by the propeller or fan. The propeller or fan includes multiple fan blades, each of which includes a leading edge. Typically that leading edge is protected by a leading edge sheath. This leading edge sheath often exhibits issues that negatively impact its usefulness.

Accordingly, a need exists for an improved leading edge sheath for a fan blade of a gas turbine engine.

BRIEF DESCRIPTION

According to an aspect of the disclosure, a sheath is provided. The sheath includes a leading edge portion having pressure and suction sides for respective association with pressure and suction sides of an airfoil and first and second wings respectively extending from the pressure and suction sides of the leading edge portion. The first wing includes a first elongate portion and a first trailing edge disposed at an end of and thinned relative to the first elongate portion. The second wing includes a second elongate portion and a second trailing edge disposed at an end of and thinned relative to the second elongate portion.

In accordance with additional or alternative embodiments, an aft edge of the leading edge portion and respective interior surfaces of the first and second wings form a cavity for receiving a leading edge of the airfoil.

In accordance with additional or alternative embodiments, the sheath further includes sheath adhesive by which the sheath is attachable to a leading edge of the airfoil.

In accordance with additional or alternative embodiments, the first and second wings have different chordal lengths.

In accordance with additional or alternative embodiments, respective profiles of each of the first and second trailing edges are curvilinear.

In accordance with additional or alternative embodiments, each of the first and second trailing edges include multiple sections of various thinning slopes.

In accordance with additional or alternative embodiments, each of the first and second trailing edges include surface features to grip an overlying erosion coating.

According to an aspect of the disclosure, an airfoil assembly is provided and includes an airfoil having a leading edge and pressure and suction sides extending from the leading edge and a sheath affixed to the leading edge of the airfoil. The sheath includes a leading edge portion having pressure and suction sides respectively associated with the pressure and suction sides of the airfoil, first and second wings respectively extending from the pressure and suction sides of the leading edge portion and respectively comprising a locally-thinned trailing edge and an erosion coating applied to the pressure and suction sides of the airfoil to overlap with the locally-thinned trailing edge of each of the first and second wings.

In accordance with additional or alternative embodiments, an aft edge of the leading edge portion and respective interior surfaces of the first and second wings form a cavity in which the leading edge of the airfoil is received.

In accordance with additional or alternative embodiments, the airfoil includes metallic materials and the airfoil assembly further includes sheath adhesive to affix the sheath to the leading edge of the airfoil and primer interposed between the erosion coating and the airfoil.

In accordance with additional or alternative embodiments, the erosion coating includes polyurethane.

In accordance with additional or alternative embodiments, the first and second wings have different chordal lengths.

In accordance with additional or alternative embodiments, each of the first and second wings includes an elongate portion and the locally-thinned trailing edge of each of the first and second wings is disposed at an end of and is thinned relative to the corresponding elongate portion.

In accordance with additional or alternative embodiments, respective profiles of the locally-thinned trailing edge of each of the first and second wings are curvilinear.

In accordance with additional or alternative embodiments, the locally-thinned trailing edge of each of the first and second wings includes multiple sections of various thinning slopes.

In accordance with additional or alternative embodiments, the locally-thinned trailing edge of each of the first and second wings includes surface features to grip onto the erosion coating.

According to an aspect of the disclosure, an airfoil assembly method for use with an airfoil having a leading edge and pressure and suction sides extending from the leading edge is provided. The airfoil assembly method includes forming a sheath to include a leading edge portion having pressure and suction sides respectively associated with the pressure and suction sides of the airfoil and first and second wings respectively extending from the pressure and suction sides of the leading edge portion and respectively comprising a locally-thinned trailing edge. The airfoil assembly method further includes adhering the sheath to the leading edge of the airfoil and applying an erosion coating to the pressure and suction sides of the airfoil to overlap with the locally-thinned trailing edge of each of the first and second wings.

In accordance with additional or alternative embodiments, the forming of the sheath includes curvilinearly thinning the locally-thinned trailing edge of each of the first and second wings.

In accordance with additional or alternative embodiments, the applying of the erosion coating is executed such that the erosion coating at least initially overlaps with respective entireties of the locally-thinned trailing edge of each of the first and second wings.

In accordance with additional or alternative embodiments, the airfoil assembly method further includes priming the pressure and suction sides of the airfoil prior to the applying of the erosion coating.

These and other advantages and features will become more apparent from the following description taken in conjunction with the drawings.

BRIEF DESCRIPTION OF THE DRAWINGS

The following descriptions should not be considered limiting in any way. With reference to the accompanying drawings, like elements are numbered alike.

These and other advantages and features will become more apparent from the following description taken in conjunction with the drawings.

DETAILED DESCRIPTION

A detailed description of one or more embodiments of the disclosed apparatus and method are presented herein by way of exemplification and not limitation with reference to the Figures.

Figure 1:
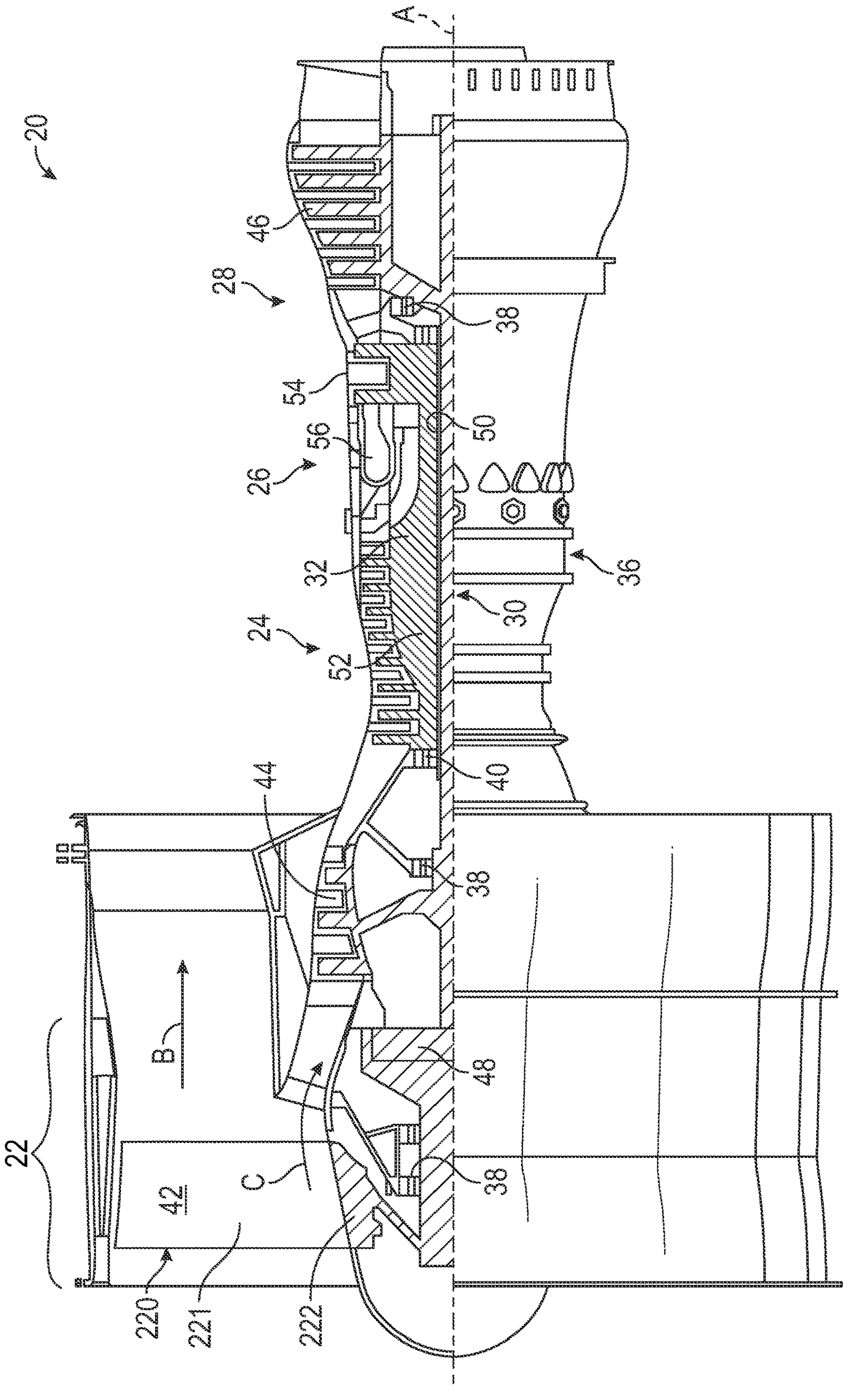
FIG. 1 is a partial cross-sectional view of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include other systems or features. The fan section 22 drives air along a bypass flow path B in a bypass duct, while the compressor section 24 drives air along a core flow path C for compression and communication into the combustor section 26 and then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary gas turbine engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in the gas turbine engine 20 between the high pressure compressor 52 and the high pressure turbine 54. The engine static structure 36 is arranged generally between the high pressure turbine 54 and the low pressure turbine 46. The engine static structure 36 further supports the bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 and then the high pressure compressor 52, is mixed and burned with fuel in the combustor 56 and is then expanded over the high pressure turbine 54 and the low pressure turbine 46. The high and low pressure turbines 54 and 46 rotationally drive the low speed spool 30 and the high speed spool 32, respectively, in response to the expansion. It will be appreciated that each of the positions of the fan section 22, compressor section 24, combustor section 26, turbine section 28, and fan drive gear system 48 may be varied. For example, geared architecture 48 may be located aft of the combustor section 26 or even aft of the turbine section 28, and the fan section 22 may be positioned forward or aft of the location of geared architecture 48.

Figure 2:
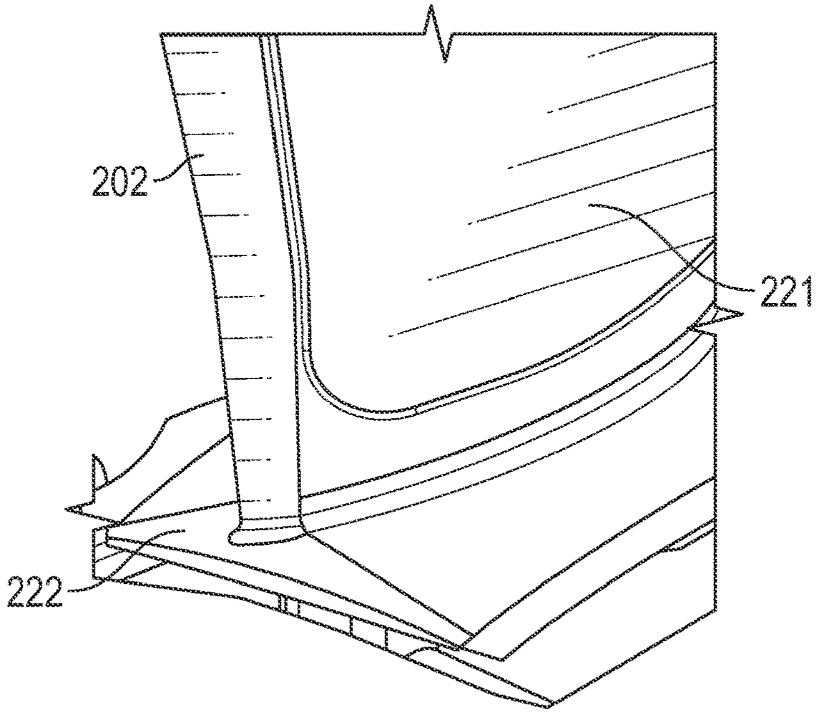
FIG. 2 is a perspective view of a fan blade of the gas turbine engine of FIG. 1.

With continued reference to FIG. 1 and with additional reference to FIG. 2, the air that is compressed in the compressor section 24 can be drawn into an inlet of the compressor section 24 by the fan 42. The fan 42 includes multiple fan blades 220, each of which includes an airfoil section 221 and a root 222. Each of the fan blades 220 is attached to a hub of the fan 42 at the root 222. For each of the fan blades 220, a leading edge sheath 202 can be provided at the leading edge of the airfoil section 221 to protect the leading edge of the airfoil section 221 from wear and damage. It has been found, however, that conventional forms of the leading edge sheath 202 exhibit certain issues.

In particular, for certain fan blade assemblies, such as hybrid aluminum fan blade assemblies, the leading edge sheath 202 is provided as a titanium sheath that protects the leading edge of the airfoil section 221. In these or other cases, the leading edge sheath 202 has a U-shaped cross-section that is applied to the leading edge while a protective erosion coating is applied to an aft portion of the leading edge sheath 202 in a manner that leads to the protective erosion coating abutting the airfoil section 221 (i.e., the titanium of the airfoil section 221).

With the construction described above, during operation of the fan 24, precipitate static charge tends to accumulate on each of the multiple fan blades 220 from particles in the air. In addition to offering erosion and corrosion protection, the protective erosion coating effectively dissipates this static charge build-up through titanium components of the airfoil section 221. It has been found, however, that the erosion coating can separate from the trailing edge of the leading edge sheath The separation can cause exposure of underlying primer and possibly progress to a point at which the erosion coating delaminates from the blade. This opens a path for water/electrolyte ingress which increases the risk of corrosion (i.e., galvanic corrosion).

Accordingly, a need exists for an improved leading edge sheath for a fan blade of a gas turbine engine.

Therefore, as will be described below, a leading edge sheath is provided for use with a leading edge of an airfoil section of a fan blade of a gas turbine engine. The leading edge sheath has wings that have reduced thicknesses at trailing edges of the leading edge sheath. An erosion coating is applied to the airfoil section and overlaps with the thinned portions of the leading edge sheath.

Figure 3:
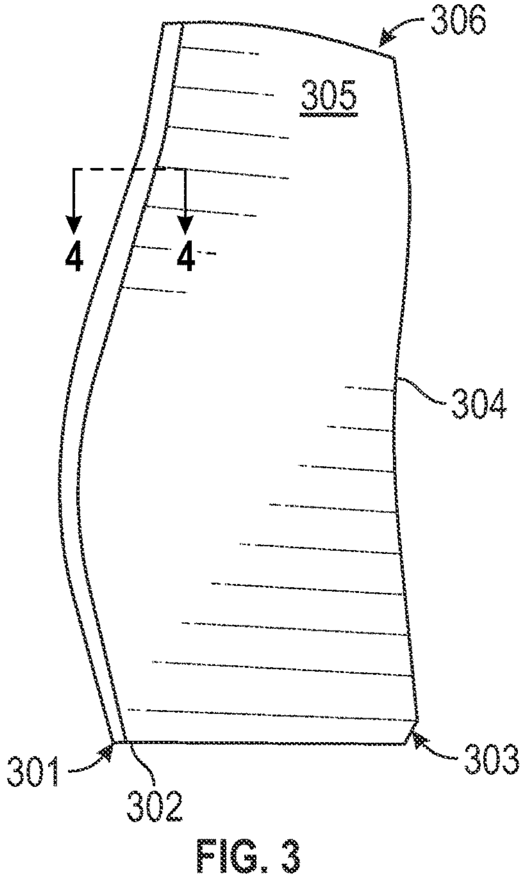
FIG. 3 is a perspective view of a fan blade of a gas turbine engine with a leading edge sheath in accordance with embodiments.
Figure 4:
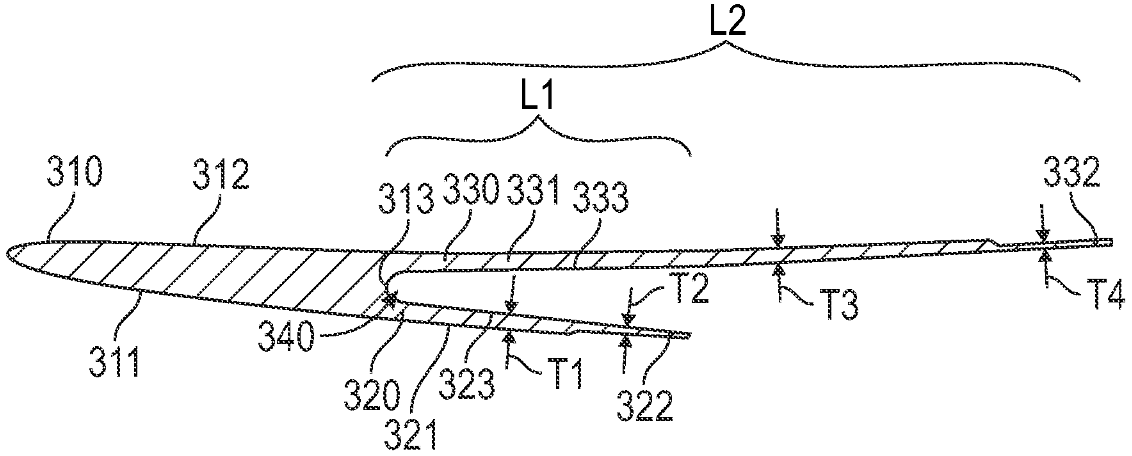
FIG. 4 is a radial view of the leading edge sheath of FIG. 3 taken along line 4-4 of FIG. 3 in accordance with embodiments.

With continued reference to FIGS. 1 and 2 and with additional reference to FIGS. 3 and 4, a leading edge sheath 301 is provided for application to a leading edge 302 of an airfoil 303, such as the leading edge of the airfoil section 221 of the gas turbine engine 20 of FIGS. 1 and 2.

The airfoil 303 includes the leading edge 302, a trailing edge 304, a pressure side 305 extending from the leading edge 302 to the trailing edge 304 and a suction side 306 extending from the leading edge 302 to the trailing edge 304. The leading edge sheath 301 can be affixed to the leading edge 302 of the airfoil 303 and includes a leading edge portion 310 having a pressure side 311 for association with the pressure side 305 of the airfoil 303 and a suction side 312 for association with the suction side 306 of the airfoil 303. The leading edge sheath 301 further includes a first wing 320 and a second wing 330. The first wing 320 extends aft from the pressure side 311 of the leading edge portion 310 and the second wing extends aft from the suction side 312 of the leading edge portion 310. The first wing 320 includes a first elongate portion 321 and a first locally-thinned trailing edge 322. The first locally-thinned trailing edge 322 is disposed at an aft end of the first elongate portion 321. The first elongate portion 321 has a thickness T1 and the first locally-thinned trailing edge 322 has a thickness T2, which is less than T1, so that the first locally-thinned trailing edge 322 is thinned relative to the first elongate portion 321. The second wing 330 includes a second elongate portion 331 and a second locally-thinned trailing edge 332. The second locally-thinned trailing edge 332 is disposed at an aft end of the second elongate portion 331. The second elongate portion 331 has a thickness T3 and the second locally-thinned trailing edge 332 has a thickness T4, which is less than T3, so that the second locally-thinned trailing edge 332 is thinned relative to the second elongate portion 331.

As shown in FIG. 4, an aft edge 313 of the leading edge portion 310 and respective interior surfaces 323 and 333 of the first and second wings 320 and 330 form a cavity 340 in which the leading edge 302 of the airfoil 303 can be received. Also as shown in FIG. 4, the first and second wings 320 and 330 can have different chordal lengths L1 and L2 that are definable along a chord of the airfoil 303.

Figure 5:
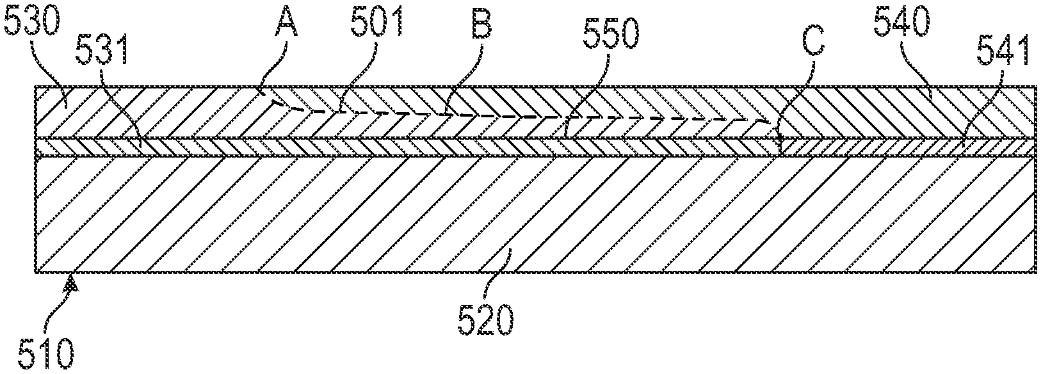
FIG. 5 is a side view of a locally-thinned trailing edge of a leading edge sheath and an overlapping erosion coating in accordance with embodiments.

With reference to FIG. 5, respective profiles 501 of each of the first locally-thinned trailing edge 322 and the second locally-thinned trailing edge 332 (see FIG. 4) are curvilinear. That is, each of the first locally-thinned trailing edge 322 and the second locally-thinned trailing edge 332 include multiple sections A, B, C of various thinning slopes. For example, as shown in FIG. 5, sections A and C can have relatively high aspect ratio (i.e., high-angled or deep) thinning slopes and section B can have a relatively low aspect ratio thinning slope (i.e., low-angled or shallow).

Figure 6:
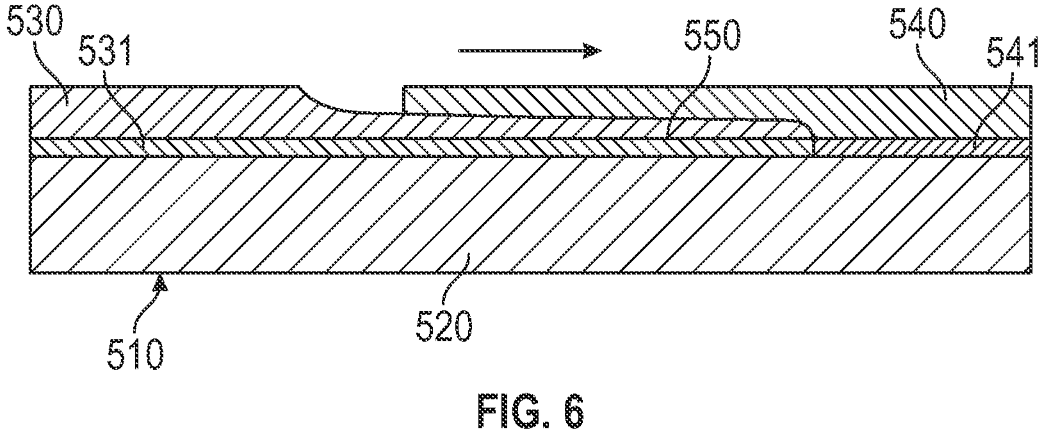
FIG. 6 is a side view of a locally-thinned trailing edge of a leading edge sheath and an overlapping erosion coating in a slightly shrunk and/or pulled back condition in accordance with embodiments.

With continued reference to FIG. 5 and with additional reference to FIG. 6, an airfoil assembly 510 is provided. The airfoil assembly 510 includes several features similar to those described above that need not be described again. For example, the airfoil assembly 510 includes an airfoil 520 and a leading edge sheath 530 as described above as well as an erosion coating 540. As another example, the leading edge sheath 530 includes a leading edge portion having pressure and suction sides respectively associated with the pressure and suction sides of the airfoil as described above and first and second wings respectively extending from the pressure and suction sides of the leading edge portion as described above. As shown in FIGS. 5 and 6, the first and second wings respectively include a locally-thinned trailing edge 550. The erosion coating 540 can be formed of polyurethane or other similar materials and is applied to the pressure and suction sides of the airfoil 520 to overlap with the locally-thinned trailing edge 550 of each of the first and second wings.

In accordance with embodiments, the airfoil 520 includes metallic materials, such as aluminum and/or titanium. In these or other cases, the airfoil assembly 510 further includes sheath adhesive 531 to affix the leading edge sheath 530 to the leading edge of the airfoil 520 and primer 541 interposed between the erosion coating 540 and the airfoil 520.

With the first and second wings including the locally-thinned trailing edge 550 and the erosion coating 540 overlapped with the locally-thinned trailing edge 550, an incidence of erosion coating 540 separation from the leading edge sheath 530 is avoided. In particular, in a case in which the erosion coating 540 is initially provided to overlap with an entirety of the locally-thinned trailing edge 550 as shown in FIG. 5, it is possible that the erosion coating 540 will shrink and/or pull back over time as shown by the arrow in FIG. 6. Due to the overlap of the erosion coating 540 and the locally-thinned trailing edge 550, however, the shrinking and/or pulling back of the erosion coating 540 will not expose the underlying metallic materials of the airfoil 520. As such, galvanic corrosion of the underlying metallic materials of the airfoil 520 can be avoided. Moreover, since the erosion coating 540 is initially provided to overlap with an entirety of the locally-thinned trailing edge 550 and since any shrinking and/or pulling back of the erosion coating 540 will be limited, a relatively smooth and relatively continuous surface of the airfoil assembly 510 can be provided.

Figure 7:
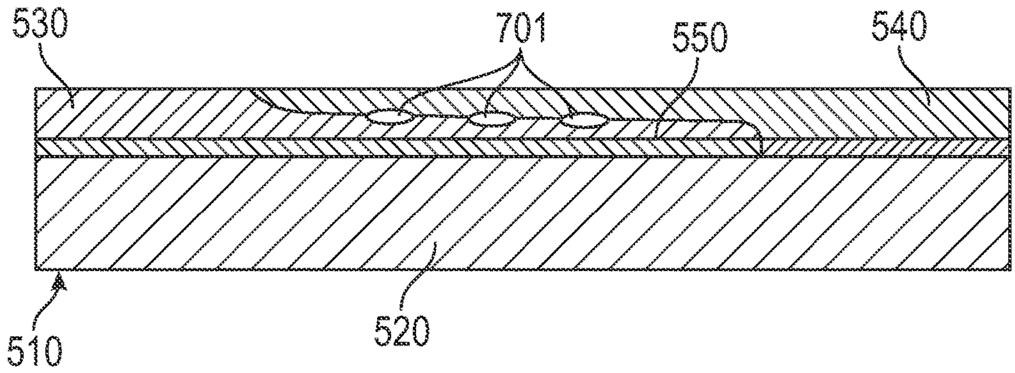
FIG. 7 is a side view of a locally-thinned trailing edge of a leading edge sheath with surface features and an overlapping erosion coating in accordance with embodiments.

With reference to FIG. 7 and in accordance with further embodiments, the locally-thinned trailing edge 550 of each of the first and second wings can include surface features 701. The surface features 701 can be provided, for example, as protrusions, bumps, troughs, hooks and/or locally roughed sections. In any case, the surface features 701 can be configured to grip onto the erosion coating 540 to resist a tendency of the erosion coating 540 to shrink and/or pull back over time.

Figure 8:
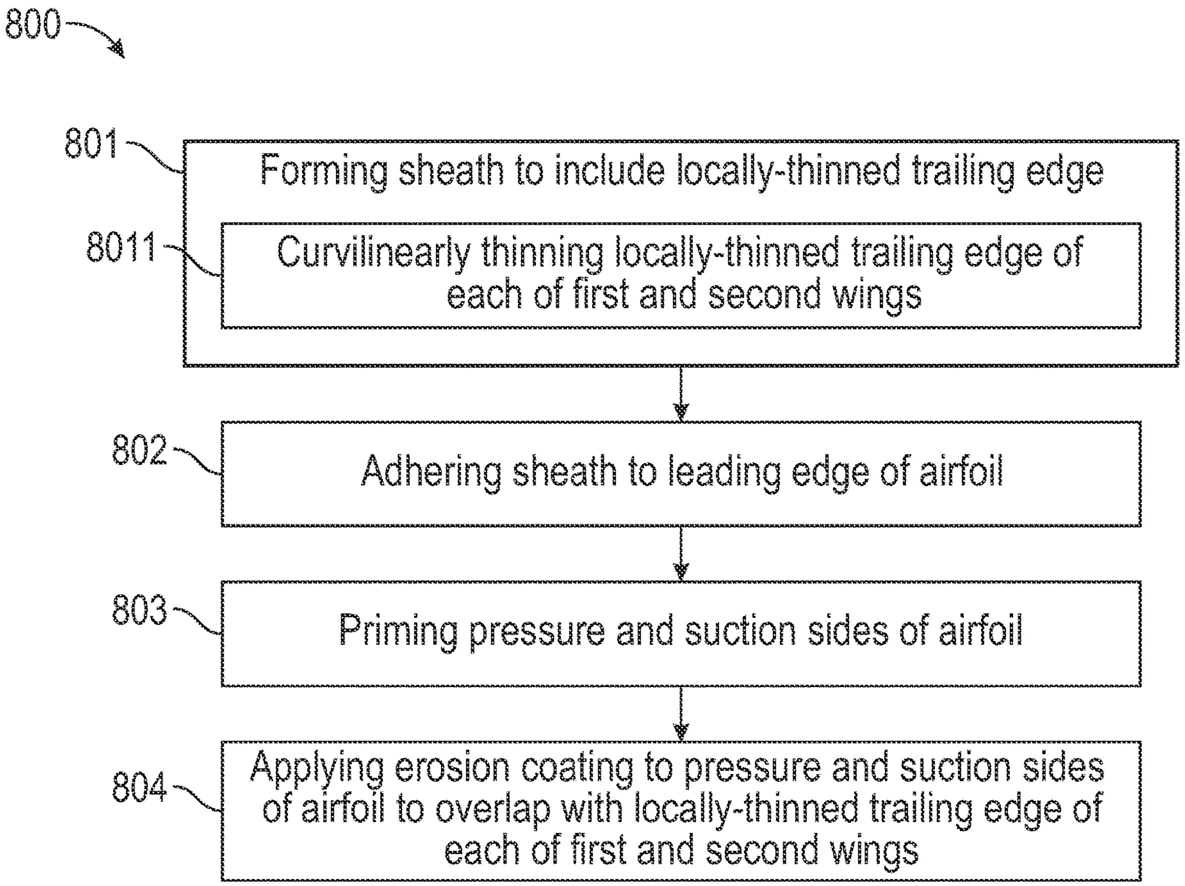
FIG. 8 is a flow diagram illustrating an airfoil assembly method in accordance with embodiments.

With reference to FIG. 8, an airfoil assembly method 800 is provided for use with an airfoil as described above that has a leading edge and pressure and suction sides extending from the leading edge as described above. The airfoil assembly method 800 includes forming a sheath as described above to include a locally-thinned trailing edge (block 801), adhering the sheath to the leading edge of the airfoil (block 802) and applying an erosion coating to the pressure and suction sides of the airfoil to overlap with the locally-thinned trailing edge of each of the first and second wings (block 804). In addition, in some cases, the airfoil assembly method 800 can include priming the pressure and suction sides of the airfoil prior to the applying of the erosion coating of blockm 804 (block 803).

In accordance with embodiments, the forming of the sheath of block 801 can include curvilinearly thinning the locally-thinned trailing edge of each of the first and second wings (block 8011) and the applying of the erosion coating of block 804 is executed such that the erosion coating at least initially overlaps with respective entireties of the locally-thinned trailing edge of each of the first and second wings.

Benefits of the features described herein are the provision of a leading edge sheath for a leading edge of an airfoil section of a fan blade of a gas turbine engine with thinned sections at the trailing edges and an erosion coating that overlaps onto the thinned sections to maintain a smooth transition. This avoids the problem of current erosion coatings in that they tend to shrink and pull away from their original position which risks exposing underlying metallic materials and galvanic corrosion. With the overlapped erosion coating, if the erosion coating shrinks and pulls back, the erosion coating still overlaps with the thinned sections of the leading edge sheath and does not expose underlying metallic materials. This reduces the risk of galvanic corrosion.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A sheath, comprising:

a leading edge portion having pressure and suction sides for respective association with pressure and suction sides of an airfoil; and first and second wings respectively extending from the pressure and suction sides of the leading edge portion, the first wing comprising a first elongate portion, which is configured to extend along in contact with the pressure side, and a first trailing edge, which is configured to extend along in contact with the pressure side and which is disposed at an end of and thinned inwardly toward the pressure side relative to the first elongate portion, and the second wing comprising a second elongate portion, which is configured to extend along in contact with the pressure side, and a second trailing edge, which is configured to extend along in contact with the pressure side and which is disposed at an end of and thinned inwardly toward the pressure side relative to the second elongate portion.

2. The sheath according to claim 1, wherein an aft edge of the leading edge portion and respective interior surfaces of the first and second wings form a cavity for receiving a leading edge of the airfoil.

3. The sheath according to claim 1, further comprising sheath adhesive by which the sheath is attachable to a leading edge of the airfoil.

4. The sheath according to claim 1, wherein the first and second wings have different chordal lengths.

5. The sheath according to claim 1, wherein respective profiles of each of the first and second trailing edges are curvilinear.

6. The sheath according to claim 5, wherein:

the first trailing edge comprises:

an upstream section of a high aspect ratio thinning slope, which is distant from the pressure side;

a downstream section of a high aspect ratio thinning slope, which terminates at the pressure side; and a first intermediate section of a low aspect ratio thinning slope, which is axially interposed between the upstream section and the downstream section, and the second trailing edge comprises:

an upstream section of a high aspect ratio thinning slope, which is distant from the suction side;

a downstream section of a high aspect ratio thinning slope, which terminates at the suction side; and a second intermediate section of a low aspect ratio thinning slope, which is axially interposed between the upstream section and the downstream section.

7. The sheath according to claim 6, wherein:

the first trailing edge comprises surface features arrayed along the first intermediate section to grip an overlying erosion coating, and the second trailing edge comprises surface features arrayed along the second intermediate section to grip an overlying erosion coating.

8. An airfoil assembly, comprising:

an airfoil having a leading edge and pressure and suction sides extending from the leading edge; and a sheath affixed to the leading edge of the airfoil and comprising:

a leading edge portion having pressure and suction sides respectively associated with the pressure and suction sides of the airfoil;

a first wing extending from the pressure side of the leading edge portion and comprising a locally-thinned trailing edge, which is thinned inwardly toward the pressure side;

a second wing extending from the suction side of the leading edge portion and comprising a locally-thinned trailing edge, which is thinned inwardly toward the suction side; and an erosion coating applied to the pressure and suction sides of the airfoil to overlap with the respective locally-thinned trailing edge of each of the first and second wings.

9. The airfoil assembly according to claim 8, wherein an aft edge of the leading edge portion and respective interior surfaces of the first and second wings form a cavity in which the leading edge of the airfoil is received.

10. The airfoil assembly according to claim 8, wherein the airfoil comprises metallic materials and the airfoil assembly further comprises:

sheath adhesive to affix the sheath to the leading edge of the airfoil; and primer interposed between the erosion coating and the airfoil.

11. The airfoil assembly according to claim 8, wherein the erosion coating comprises polyurethane.

12. The airfoil assembly according to claim 8, wherein the first and second wings have different chordal lengths.

13. The airfoil assembly according to claim 8, wherein:

the first wing comprises an elongate portion which extends along in contact with the pressure side, the locally-thinned trailing edge of the first wing extends along in contact with the pressure side and is disposed at an end of and is thinned inwardly toward the pressure side relative to the elongate portion of the first wing, the second wing comprises an elongate portion which extends along in contact with the suction side, and the locally-thinned trailing edge of the second wing extends along in contact with the suction side and is disposed at an end of and is thinned inwardly toward the suction side relative to the elongate portion of the second wing.

14. The airfoil assembly according to claim 8, wherein respective profiles of the locally-thinned trailing edge of each of the first and second wings are curvilinear.

15. The airfoil assembly according to claim 14, wherein;

the locally-thinned trailing edge of the first wing comprises:

an upstream section of a high aspect ratio thinning slope, which is distant from the pressure side;

a downstream section of a high aspect ratio thinning slope, which terminates at the pressure side; and a first intermediate section of a low aspect ratio thinning slope, which is axially interposed between the upstream section and the downstream section, and the locally-thinned trailing edge of the second wing comprises:

an upstream section of a high aspect ratio thinning slope, which is distant from the suction side;

a downstream section of a high aspect ratio thinning slope, which terminates at the suction side; and a second intermediate section of a low aspect ratio thinning slope, which is axially interposed between the upstream section and the downstream section.

16. The airfoil assembly according to claim 15, wherein:

the locally-thinned trailing edge of the first wing comprises surface features arrayed along the first intermediate section to grip onto the erosion coating, and the locally-thinned trailing edge of the second wing comprises surface features arrayed along the second intermediate section to grip onto the erosion coating.

17. An airfoil assembly method for use with an airfoil having a leading edge and pressure and suction sides extending from the leading edge, the airfoil assembly method comprising:

forming a sheath to comprise;

a leading edge portion having pressure and suction sides respectively associated with the pressure and suction sides of the airfoil;

a first wing extending from the pressure side of the leading edge portion and comprising a locally-thinned trailing edge, which is thinned inwardly toward the pressure side; and a second wing extending from the suction side of the leading edge portion and comprising a locally-thinned trailing edge, which is thinned inwardly toward the suction side;

adhering the sheath to the leading edge of the airfoil; and applying an erosion coating to the pressure and suction sides of the airfoil to overlap with the locally-thinned trailing edge of each of the first and second wings.

18. The airfoil assembly method according to claim 17, wherein the forming of the sheath comprises curvilinearly thinning the locally-thinned trailing edge of each of the first and second wings such that:

the locally-thinned trailing edge of the first wing comprises:

an upstream section of a high aspect ratio thinning slope, which is distant from the pressure side;

a downstream section of a high aspect ratio thinning slope, which terminates at the pressure side; and a first intermediate section of a low aspect ratio thinning slope, which is axially interposed between the upstream section and the downstream section, and the locally-thinned trailing edge of the second wing comprises:

an upstream section of a high aspect ratio thinning slope, which is distant from the suction side;

a downstream section of a high aspect ratio thinning slope, which terminates at the suction side; and a second intermediate section of a low aspect ratio thinning slope, which is axially interposed between the upstream section and the downstream section.

19. The airfoil assembly method according to claim 17, wherein the applying of the erosion coating is executed such that the erosion coating at least initially overlaps with respective entireties of the locally-thinned trailing edge of each of the first and second wings.

20. The airfoil assembly method according to claim 17, further comprising priming the pressure and suction sides of the airfoil prior to the applying of the erosion coating.

* * * * *